United States Patent
Hangleiter

(10) Patent No.: US 7,165,921 B2
(45) Date of Patent: Jan. 23, 2007

(54) COLLET CHUCK

(75) Inventor: Eugen Hangleiter, Hermaringen (DE)

(73) Assignee: Rohm GmbH, Sontheim (DE)

( * ) Notice: Subject to any disclaimer, the term of this patent is extended or adjusted under 35 U.S.C. 154(b) by 0 days.

(21) Appl. No.: 10/526,709

(22) PCT Filed: Aug. 22, 2003

(86) PCT No.: PCT/DE03/02830

§ 371 (c)(1),
(2), (4) Date: Mar. 3, 2005

(87) PCT Pub. No.: WO2004/024380

PCT Pub. Date: Mar. 25, 2004

(65) Prior Publication Data

US 2006/0002778 A1    Jan. 5, 2006

(30) Foreign Application Priority Data

Sep. 7, 2002   (DE) .................... 102 41 613

(51) Int. Cl.
*B23C 5/26* (2006.01)
(52) U.S. Cl. .............. 409/233; 409/232; 279/137; 408/239 R; 408/240
(58) Field of Classification Search ........... 409/232, 409/233, 234; 279/2.04, 2.03, 2.02, 137, 279/23.1, 2.14, 2.15, 900; 408/239 R, 239 A, 408/240

See application file for complete search history.

(56) References Cited

U.S. PATENT DOCUMENTS

| 5,443,340 | A | * | 8/1995 | Reinauer et al. | ............. | 409/233 |
| 5,860,776 | A | * | 1/1999 | Sato et al. | .................. | 409/233 |
| 5,957,468 | A | * | 9/1999 | Weh et al. | ................. | 279/2.04 |
| 5,964,556 | A | * | 10/1999 | Toyomoto | .................... | 409/232 |
| 6,287,059 | B1 | * | 9/2001 | Hashidate et al. | .......... | 409/233 |
| 6,419,430 | B1 | | 7/2002 | Hangleiter | | |
| 6,436,021 | B1 | * | 8/2002 | Nukui | ........................ | 409/233 |
| 6,568,889 | B1 | * | 5/2003 | Rohm | ........................ | 409/233 |
| 2002/0063399 | A1 | * | 5/2002 | Rohm | ....................... | 279/2.02 |

FOREIGN PATENT DOCUMENTS

DE    41 38 974    6/1993

* cited by examiner

*Primary Examiner*—Dana Ross
(74) *Attorney, Agent, or Firm*—Andrew Wilford

(57) ABSTRACT

A holder for a collar having an axially forwardly directed shoulder and axially rearward thereof a radially outwardly directed centering surface has a drive sleeve fitted over the collar and a plurality of angularly spaced jaws each formed with an axially rearwardly directed face and displaceable between an outer position with their faces bearing on the shoulder and an inner position with their faces out of engagement with the collar. An axially displaceable actuating member can move the jaws between their inner and outer positions. A plurality of retaining fingers each have an axially rearwardly directed face and axially rearward thereof a radially outwardly directed centering face. These fingers are each radially elastically deformable between an outer position with the front-end faces bearing axially rearward on the shoulder and the centering faces bearing radially outward on the collar centering surface and an inner position out of contact with the collar.

3 Claims, 3 Drawing Sheets

COLLET CHUCK

CROSS REFERENCE TO RELATED APPLICATIONS

This application is the US national phase of PCT application PCT/DE03/02830, filed 22 Aug. 2003, published 25 Mar. 2004 as WO 2004/024380, and claiming the priority of German patent application 10241613.3 itself filed 7 Sep. 2002.

FIELD OF THE INVENTION

The inventions relates to a collet chuck or holder of a machining apparatus for a collar of a collet, tool, workpiece, or the like that has an internal angled retaining surface, having retaining jaws that are mounted on a drive spindle of the machining apparatus and that are operable by an axially shiftable head in the drive spindle and that engage for clamping with complementary angled faces on the retaining surface, and further having a retaining element mounted on the drive spindle and formed with radially deflectable retaining fingers extending parallel to the retaining jaws and having angled retaining faces complementary to the clamping faces and engageable with the clamping faces of the collar of the machining apparatus.

BACKGROUND OF THE INVENTION

Such holders, which are known for example from DE 299 22 642 and U.S. Pat. No. 6,419,630, have the advantage that the retaining element retains the collar in place during loading by the loader before the full clamping force is applied. The loader can thus release immediately so that the clamping operation is shortened. The same shortened time is achieved during release of the clamping. In spite of the good operation of such a holder it is useful in practice when after release by the loader the collar is better and more quickly gripped.

OBJECT OF THE INVENTION

It is therefore an object of the invention to provide a holder of the above-described type where the collar is accurately positioned in the holder before application of the full clamping force as well as aster it is released.

SUMMARY OF THE INVENTION

This object is achieved according to the invention in a holder of the above-described type in that each of the retaining fingers has axially inward of the respective retaining face toward the drive spindle a radially outwardly directed centering face engageable with a free end of the collar.

With such a system there is the advantage that when the collar is slid into the drive spindle it is also aligned by the centering faces so that there is more room for the clamping movement of the jaws and thus they work more surely. After release, the collar is held on center by the centering faces so that the loader can engage better into the gripper edge of the collar and clamp it.

Preferably according to the invention the centering faces act frictionally for centering and retaining. Thus on release there is the advantage that the centering and retaining faces produce friction so that a greater knockout blow can be administered to the collar so that the collar would have to be retained and held only by the retaining faces of the retaining element.

In order to retain the collar before or after application of the clamping force it is preferably that the retaining fingers be prestressed radially outward.

It is further within the scope of the invention that between each centering face and the respective retaining face there is an indent that facilitates the centering action when the collar is not perfectly centered by the loader in the drive spindle during loading.

BRIEF DESCRIPTION OF THE DRAWING

The invention is more closely described in the following with reference to an embodiment shown in the drawing; therein.

SPECIFIC DESCRIPTION

Figure 1:
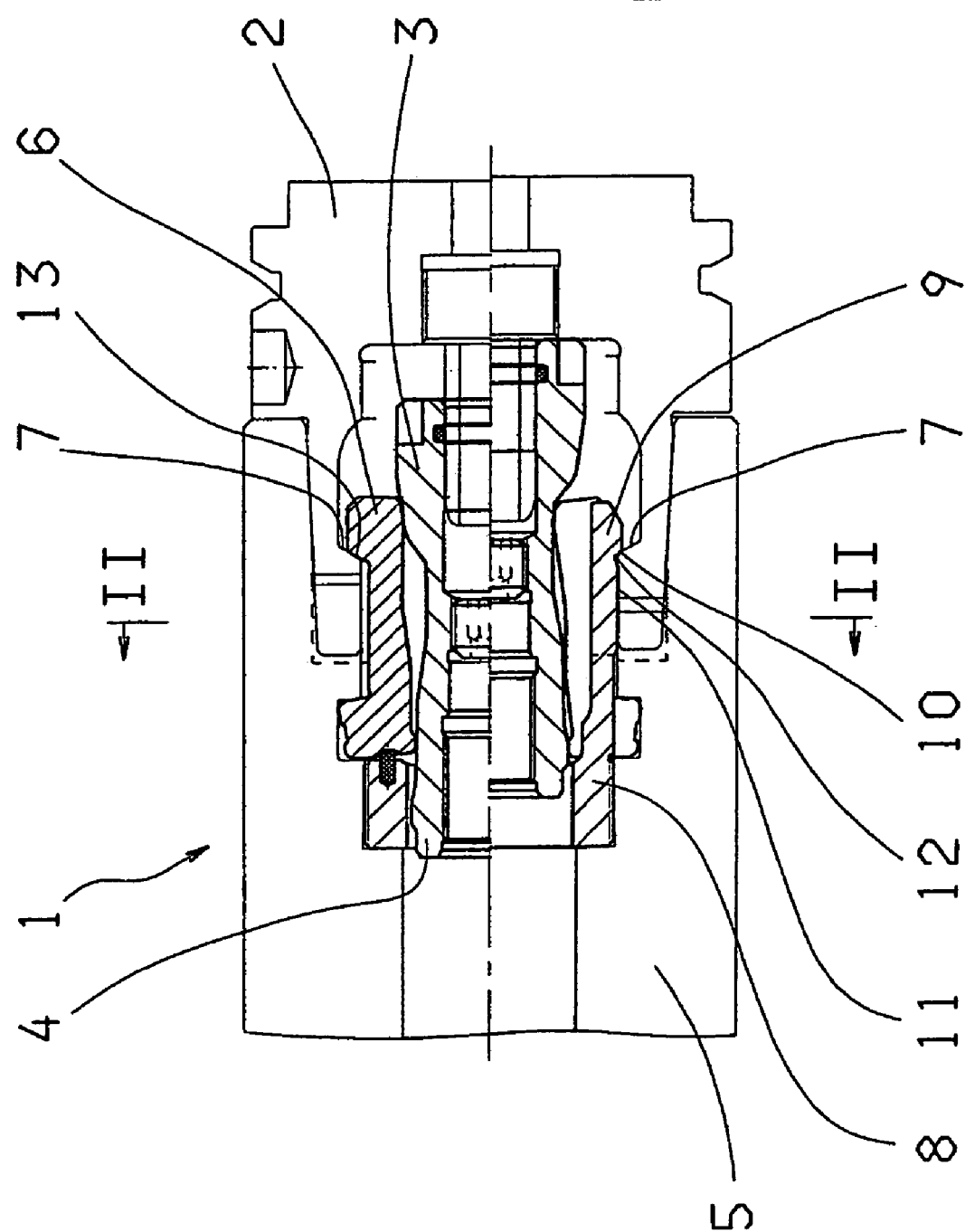
FIG. 1 is a longitudinal section through the collar-holding axial end of a holder, shown in the clamping position in the upper part and in the releasing position in the lower part.
Figure 2:
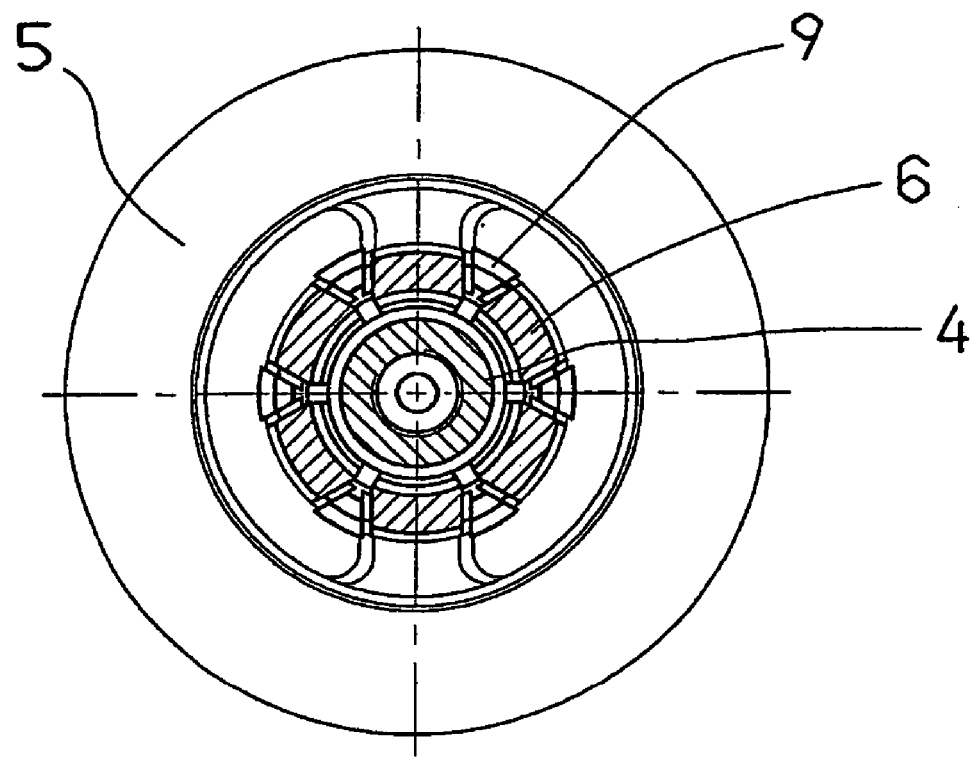
FIG. 2 is a section taken along line II—II of FIG. 1 without the tool.
Figure 3:
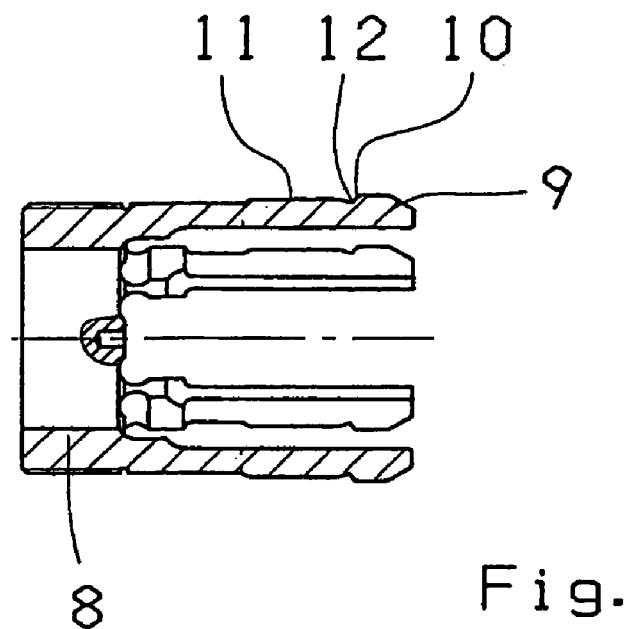
FIG. 3 is a longitudinal section showing only the retainer.
Figure 4:
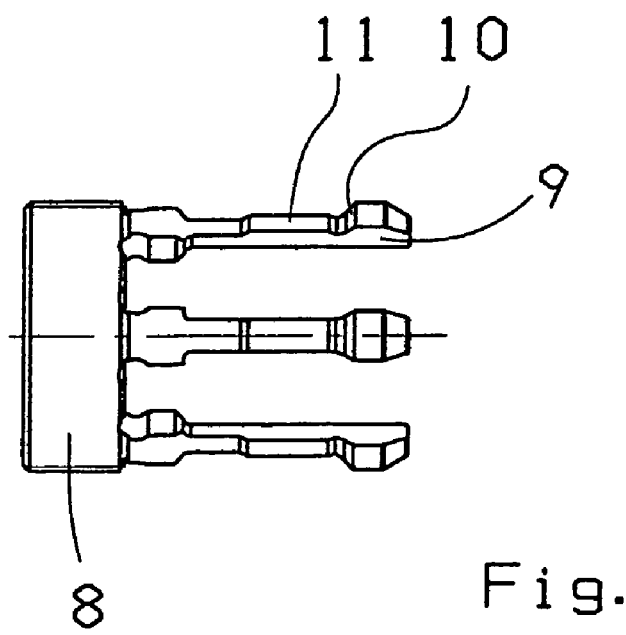
FIG. 4 is a side view of the retainer of FIG. 3.

FIG. 1 shows the parts relevant to the invention of a holder 1 of a machining apparatus that is basically known and that complies with what is described in DE 41 38 974 so that it does not need to be described in detail here. In an axial outer end of the holder 1 turned toward a collar 2 there is a head 3 that is connected with an actuating rod 4 that is shiftable axially of a drive sleeve or spindle 5 so that the head 3 can be shifted from the FIG. 1 lower releasing position into the FIG. 1 upper clamping position. In the clamping position, jaws 6 of the holder 1 engage via angled clamping faces 13 with an angled shoulder or surface 7 formed in the collar 2 so as to clamp the collar 2. The holder 1 further has a retaining element 8 that is mounted in the drive spindle 5 and that has radially elastically deflectable retaining fingers 9 extending parallel to the clamping jaws 6 and having angled retaining faces 10 complementary to the angled face 7 so that they can engage the angled face 7 of the collar 2 on the machining apparatus and hold same even before the full clamping force has been exerted or after the clamping force has been released so as to make switching of the collar 2 by a loader possible. Each of the retaining fingers 9 has axially inward of the respective retaining face 10 toward the drive spindle 5 a radially outwardly directed centering face 11 engageable with the free end of the collar 2 and functioning as a result of friction as a centering and holding surface. Between each centering face 11 and the respective retaining face 10 there is an indent or notch 12; the retaining fingers 9 are prestressed radially outward.

It is therefore possible for the loader to set a collar 2 into the holder 1 where it is immediately centered and retained by the retaining element 8, the retention being done by the faces 10 and the centering being done by the faces 11. In order to clamp the collar 2 the head 3 is moved from the FIG. 1 lower position into the FIG. 1 upper position in which the jaws 6 engage the clamping face 7 and the collar 2 is gripped with considerable force. Even after the clamping is released, that is when the head 3 is moved from the clamping position into the releasing position, the collar 2 remains on center, so a solid knockout blow delivered to the collar 2 does not however separate the collar 2 from the holder 1, since the retaining element 8 prevents excessive outward movement of the collar 2 by means of its retaining faces 10 and also its centering faces 11.

The invention claimed is:

1. A holder for a collar centered on an axis and having an axially forwardly directed shoulder and axially rearward thereof a radially outwardly directed centering surface, the holder comprising:
- a drive sleeve also centered on the axis and fitted over the collar;
- a plurality of angularly spaced jaws in the sleeve having outer ends each formed with an axially rearwardly directed face, the jaws being displaceable radially between an outer clamping position with their faces bearing on the shoulder and an inner releasing position with their faces out of engagement with the collar;
- means including an axially displaceable actuating member in the sleeve for moving the jaws between their inner and outer positions; and
- a retainer having a plurality of axially extending fingers each having a front end with an axially rearwardly directed face and axially rearward thereof a radially outwardly directed centering face, the fingers each being radially elastically deformable between an outer position with the front-end faces bearing axially rearward on the shoulder and the centering faces bearing radially outward on the collar centering surface and an inner position out of contact with the collar, each finger being formed with a radially outwardly open notch between the respective centering face and the respective rearwardly directed face.

2. The holder defined in claim 1 wherein the centering surface of the collar is substantially cylindrical and centered on the axis and the centering faces of the fingers are complementarily part cylindrical.

3. The holder defined in claim 1 wherein the fingers are in the outer positions when unstressed.

* * * * *